United States Patent
Kawanago et al.

(10) Patent No.: US 11,117,224 B2
(45) Date of Patent: Sep. 14, 2021

(54) FLUX AND SOLDER PASTE

(71) Applicant: SENJU METAL INDUSTRY CO., LTD., Tokyo (JP)

(72) Inventors: Tomohisa Kawanago, Shimotsuke (JP); Takahiro Nishizaki, San Jose, CA (US)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 17/049,617

(22) PCT Filed: Apr. 15, 2019

(86) PCT No.: PCT/JP2019/016155
§ 371 (c)(1),
(2) Date: Oct. 22, 2020

(87) PCT Pub. No.: WO2019/208305
PCT Pub. Date: Oct. 31, 2019

(65) Prior Publication Data
US 2021/0078113 A1  Mar. 18, 2021

(30) Foreign Application Priority Data
Apr. 26, 2018 (JP) .............. JP2018-085404

(51) Int. Cl.
*B23K 35/362* (2006.01)
*B23K 35/02* (2006.01)
*B23K 35/26* (2006.01)
*B23K 35/36* (2006.01)

(52) U.S. Cl.
CPC .......... *B23K 35/362* (2013.01); *B23K 35/025* (2013.01); *B23K 35/262* (2013.01); *B23K 35/3602* (2013.01); *B23K 35/3615* (2013.01)

(58) Field of Classification Search
CPC ..................... B23K 35/362; B23K 35/025
USPC ........................................ 148/23
See application file for complete search history.

(56) References Cited

U.S. PATENT DOCUMENTS

| 5,919,317 A | 7/1999 | Tanahashi et al. |
| 2004/0000355 A1* | 1/2004 | Suga ............... B23K 35/262 148/25 |
| 2016/0251531 A1* | 9/2016 | Uchida ............ C09D 11/033 427/58 |

FOREIGN PATENT DOCUMENTS

| CN | 101484271 | 7/2009 |
| CN | 104416297 | 3/2015 |
| JP | A-06-087090 | 3/1994 |
| JP | 09-094691 | 4/1997 |
| JP | 2004-025305 | 1/2004 |
| JP | 2007-227493 | 9/2007 |
| JP | 2013-039580 | 2/2013 |
| JP | 6160788 | 7/2017 |
| JP | 2018-034190 | 3/2018 |
| TW | 200306900 | 12/2003 |

OTHER PUBLICATIONS

International SearchReport for PCT/JP2019/016155, dated Jul. 9, 2019.
Chinese Office Action (Application No. 201980026347.4) dated Apr. 6, 2021.

* cited by examiner

*Primary Examiner* — Weiping Zhu
(74) *Attorney, Agent, or Firm* — Nixon Peabody LLP; Jeffrey L. Costellia

(57) ABSTRACT

Provided is a flux capable of obtaining predetermined rheological characteristics both at room temperature and under a thermal history that is assumed for soldering and capable of suppressing the amount of a residue after soldering to realize a low residue. The flux contains a first alcohol compound that has two or more OH groups and has a melting point of lower than 25° C. and a second alcohol compound that has two or more OH groups and has a melting point of higher than 25° C., the first alcohol compound is glycerin, the second alcohol compound is 2,5-dimethylhexane-2,5-diol, the flux has a viscosity of 10 Pa·s or more and 50 Pa·s or less at 25° C. and has a viscosity of more than 0 Pa·s and 1 Pa·s or less at 100° C., and, in a case where 10 mg of the flux is heated up to 25° C. to 250° C. under a $N_2$ atmosphere at a temperature rise rate of 10° C./min, the weight of the flux after heating is 15% or less of the weight of the flux before heating.

17 Claims, No Drawings

FLUX AND SOLDER PASTE

TECHNICAL FIELD

The present invention relates to a flux that is used for soldering and a solder paste using this flux.

BACKGROUND ART

Generally, fluxes that are used for soldering have efficacy of chemically removing a metal oxide present on a solder and the metallic surface of an object to be joined, which is an object of soldering, and of enabling the movement of a metal element in the boundary between the solder and the object. Therefore, soldering using the flux allows the formation of an intermetallic compound between the solder and the metallic surface of the object to be joined, and strong bonding can be obtained.

Recently, in response to the development of small information devices, the size reduction of electronic components that are mounted in the small information devices have been rapidly proceeding. To electronic components, a ball grid array (BGA) in which electrodes are disposed on the rear surface is applied in order to meet a demand for the narrowing of connection terminals or the reduction of the mounting area, which arises from the requirement of size reduction.

On an electrode on the BGA, a solder bump is formed. As a method for producing a solder bump, adopted is a method in which a solder ball is mounted on an electrode coated with a flux and heated.

The volatility and the rheological characteristics such as viscosity and thixotropic ratio of the flux are determined by a base agent, a solvent, and a thixotropic agent. In soldering using a solder ball, unless the flux has a predetermined viscosity at normal temperature, the flux flows out, and it is not possible to hold the solder ball on the electrode. Therefore, conventionally, predetermined rheological characteristics were obtained by containing a predetermined amount of rosin in the flux.

However, rosin does not easily volatilize under a thermal history that is assumed for soldering and becomes a main component of a residue. The addition of rosin, a base agent, and a thixotropic agent, which are likely to remain under the thermal history that is assumed for soldering, causes an increase in the amount of a residue. When the amount of the residue increases, there is a case where the soldering using a solder ball becomes unsuitable for no-clean applications where electronic components are used without cleaning a residue after soldering. Therefore, there is a demand for a low-residue flux.

Therefore, a flux that contains 2,4-diethyl-1,5-pentanediol as a solvent and realizes a low residue without containing rosin has been proposed (for example, refer to Patent Literature 1). 2,4-Diethyl-1,5-pentanediol is a solvent that has a high viscosity at room temperature and is volatile under the thermal history that is assumed for soldering.

CITATION LIST

Patent Literature

[Patent Literature 1]
Japanese Patent No. 6160788

SUMMARY OF INVENTION

Technical Problem

However, solvents that have a high viscosity at room temperature and, under the thermal history that is assumed for soldering, are converted into the liquid state such that molten solder sufficiently spreads and, furthermore, are volatile are extremely rare. Therefore, the degree of freedom for solvents has been low in designing low-residue fluxes.

The present invention has been made in order to solve such a problem, and an object of the present invention is to provide a flux that is capable of obtaining predetermined rheological characteristics both at room temperature and under the thermal history that is assumed for soldering and is capable of suppressing the amount of a residue after soldering to realize a low residue, which enables the application of the flux to applications in which electronic components are used without cleaning a residue, and a solder paste using this flux.

Solution to Problem

It was found that, when a flux contains two kinds of alcohol compounds that have different aspects in the room temperature region, predetermined rheological characteristics can be obtained both at room temperature and under the thermal history that is assumed for soldering, and volatility can be obtained under the thermal history that is assumed for soldering.

Therefore, the present invention is a flux containing alcohol compounds that has two or more OH groups, the flux containing a first alcohol compound that has two or more OH groups and has a melting point of lower than 25° C. and a second alcohol compound that has two or more OH groups and has a melting point of higher than 25° C., the first alcohol compound is glycerin, the second alcohol compound is 2,5-dimethylhexane-2,5-diol, the flux has a viscosity of 10 Pa·s or more and 50 Pa·s or less at 25° C. and has a viscosity of more than 0 Pa·s and 1 Pa·s or less at 100° C., and, in a case where 10 mg of the flux is heated up to 25° C. to 250° C. under a $N_2$ atmosphere at a temperature rise rate of 10° C./min, a weight of the flux after heating is 15% or less of the weight of the flux before heating.

In the flux of the present invention, in a case where 10 mg of the flux is heated up to 25° C. to 250° C. under the $N_2$ atmosphere at a temperature rise rate of 10° C./min, the weight of the flux after heating is more preferably 5% or less of the weight of the flux before heating.

In addition, the flux of the present invention more preferably contains 55 wt % or more and 90 wt % or less of glycerin and 5 wt % or more and 30 wt % or less of 2,5-dimethylhexane-2,5-diol, and a weight ratio of glycerin to 2,5-dimethylhexane-2,5-diol, which is denoted as the first alcohol compound/the second alcohol compound, is more preferably 1.83 or more and 12.40 or less.

The flux of the present invention further contains 0% or more and 10 wt % of an organic acid, 0 wt % or more and 10 wt % or less of an amine, 0 wt % or more and 15 wt % or less of a solvent, 0 wt % or more and 15 wt % or less of a thixotropic agent, and 0 wt % or more and 10 wt % or less of a base agent.

In addition, the flux of the present invention may contain at least one of a halogen compound, a colorant, a defoamer, an antioxidant, and a surfactant.

Furthermore, the present invention is a solder paste containing the above-described flux and metal powder.

Advantageous Effects of Invention

The flux of the present invention contains the first alcohol compound that has two or more OH groups and has a melting point of lower than 25° C. and the second alcohol compound that has two or more OH groups and has a melting point of higher than 25° C., the first alcohol compound is glycerin, the second alcohol compound is 2,5-dimethylhexane-2,5-diol, the flux has a viscosity of 10 Pa·s or more and 50 Pa·s or less at 25° C. and has a viscosity of more than 0 Pa·s and 1 Pa·s or less at 100° C., and, in measurement by the thermogravimetry method, in a case where 10 mg of the flux is heated up to 25° C. to 250° C. under a $N_2$ atmosphere at a temperature rise rate of 10° C./min, the weight of the flux after heating is 15% or less of the weight of the flux before heating, and thus the flux has predetermined rheological characteristics that are respectively suitable both at room temperature and under a thermal history that is assumed for soldering. In addition, the flux is capable of realizing a low residue by suppressing the amount of a residue and can be applied to applications where electronic components are used without cleaning a residue after soldering. In the solder paste of the present invention, the flux of the present invention is used. The flux does not flow out at room temperature; however, under the thermal history that is assumed for soldering, the flux flows and removes a metal oxide, whereby it is possible to cause molten metal powder to spread. In addition, the solder paste can be applied to applications where electronic components are used without cleaning a residue after soldering.

As described above, the aspects of two kinds of alcohol compounds in the room temperature region, which is 25° C., are defined depending on the melting point, and two kinds of alcohol compounds that have different aspects in the room temperature region are contained, whereby the degree of freedom for designing a low-residue flux improves.

DESCRIPTION OF EMBODIMENTS

Example of Flux of Present Embodient

A flux of the present embodiment has a first alcohol compound that has two or more OH groups and has a melting point of lower than 25° C. and a second alcohol compound that has two or more OH groups and has a melting point of higher than 25° C. The flux has a viscosity of 10 Pa·s or more and 50 Pa·s or less at 25° C. and has a viscosity of more than 0 Pa·s and 1 Pa·s or less at 100° C.

In addition, in measurement by the thermogravimetry method, the flux of the present embodiment has a weight as described below. That is, in a case where 10 mg of the flux is heated up to 25° C. to 250° C. under the $N_2$ atmosphere at a temperature rise rate of 10° C./min, the weight of the flux after heating is 15% or less of the weight of the flux before heating.

The flux containing the first alcohol compound having a melting point of lower than 25° C. and the second alcohol compound having a melting point of higher than 25° C. can be provided with predetermined rheological characteristics that are respectively suitable both at room temperature and under the thermal history that is assumed for soldering even when the amount of rosin or the like, a base agent such as a resin, or a thixotropic agent is decreased or even when neither the base agent nor the thixotropic agent is contained. Rosin is more preferably not contained.

Therefore, the weight of the flux after being heated can be set to 15% or less of the weight of the flux before being heated, and, when the weight after heating is 15% or less of the weight before heating, the flux can be regarded as a low-residue flux that can be used for no-clean applications.

Here, as the low-residue flux, in a case where 10 mg of the flux is heated up to 25° C. to 250° C. under the $N_2$ atmosphere at a temperature rise rate of 10° C./min, the weight of the flux after heating is more preferably 5% or less of the weight of the flux before heating.

When the entire mass of flux is regarded as 100 wt %, the flux of the present embodiment contains 55 wt % or more and 90 wt % or less of the first alcohol compound and 5 wt % or more and 30 wt % or less of the second alcohol compound. In addition, in the flux of the present embodiment, the weight ratio of the first alcohol compound to the second alcohol compound is 1.83 or more and 12.40 or less in the case of being expressed as the first alcohol compound/the second alcohol compound.

The first alcohol compound and the second alcohol compound have 2 or more and 6 or less OH groups. The first alcohol compound more preferably has 3 or more and 4 or less OH groups. In addition, the second alcohol compound more preferably has 2 or more and 4 or less OH groups.

For the first alcohol compound, in a case where 10 mg of the first alcohol compound is heated up to 25° C. to 250° C. under a $N_2$ atmosphere at a temperature rise rate of 10° C./min, the weight of the first alcohol compound after heating is preferably 15% or less of the weight of the first alcohol compound before heating, and, in a case where 10 mg of the first alcohol compound is heated up to 25° C. to 250° C. under a $N_2$ atmosphere at a temperature rise rate of 10° C./min, the weight of the first alcohol compound after heating is more preferably 5% or less of the weight of the first alcohol compound before heating.

In addition, for the second alcohol compound, in a case where 10 mg of the second alcohol compound is heated up to 25° C. to 250° C. under a $N_2$ atmosphere at a temperature rise rate of 10° C./min, the weight of the second alcohol compound after heating is preferably 15% or less of the weight of the second alcohol compound before heating, and, in a case where 10 mg of the second alcohol compound is heated up to 25° C. to 250° C. under a $N_2$ atmosphere at a temperature rise rate of 10° C./min, the weight of the second alcohol compound after heating is more preferably 5% or less of the weight of the second alcohol compound before heating.

The first alcohol compound more preferably has a viscosity of less than 10 Pa·s at 25° C. In addition, the first alcohol compound is more preferably glycerin. Glycerin is also capable of functioning as an activator. The activator removes a metal oxide. Glycerin has a viscosity of 0.9 Pa·s at 25° C. In addition, in a case where 10 mg of glycerin is heated up to 25° C. to 250° C. under the $N_2$ atmosphere at a temperature rise rate of 10° C./min, the weight of glycerin after heating is 5% or less of the weight of glycerin before heating, and glycerin is volatile under the thermal history that is assumed for soldering. The second alcohol compound is more preferably 2,5-dimethylhexane-2,5-diol. In addition, in a case where 10 mg of 2,5-dimethylhexane-2,5-diol is heated up to 25° C. to 250° C. under the $N_2$ atmosphere at a temperature rise rate of 10° C./min, the weight of 2,5-dimethylhexane-2,5-diol after heating is 5% or less of the weight of glycerin before heating, and 2,5-dimethylhexane-2,5-diol is volatile under the thermal history that is assumed for soldering.

An alcohol compound having two or more OH groups is capable of functioning as an activator, which removes a metal oxide. Therefore, the flux can be made more active by further adding an activator.

Therefore, the flux of the present embodiment further contains 0 wt % or more and 10 wt % or less of an organic acid and 0 wt % or more and 10 wt % or less of an amine as activators.

In addition, the flux of the present embodiment further contains 0 wt % or more and 15 wt % or less of a solvent.

The flux of the present embodiment may contain a thixotropic agent and a base agent as long as the effect for a low residue is not impaired, and furthermore, the flux may contain 0 wt % or more and 15 wt % or less of the thixotropic agent and 0 wt % or more and 10 wt % or less of the base agent.

The flux of the present embodiment may contain at least one of a halogen compound, a colorant, a defoamer, an antioxidant, and a surfactant as other additives.

Examples of the organic acid include glutaric acid, adipic acid, azelaic acid, eicosanedioic acid, citric acid, glycolic acid, succinic acid, salicylic acid, diglycolic acid, dipicolinic acid, dibutylaniline diglycolic acid, suberic acid, sebacic acid, thioglycolic acid, phthalic acid, isophthalic acid, terephthalic acid, dodecanedioic acid, parahydroxyphenylacetic acid, picolinic acid, phenylsuccinic acid, fumaric acid, maleic acid, malonic acid, lauric acid, benzoic acid, tartaric acid, tris(2-carboxyethyl) isocyanurate, glycine, 1,3-cyclohexanedicarboxylic acid, 2,2-bis(hydroxymethyl)propionic acid, 2,2-bis(hydroxymethyl)butanoic acid, 4-tert-butylbenzoic acid, 2,3-dihydroxybenzoic acid, 2,4-diethylglutaric acid, 2-quinolinecarboxylic acid, 3-hydroxybenzoic acid, malic acid, p-anisic acid, palmitic acid, stearic acid, 12-hydroxystearic acid, oleic acid, linoleic acid, linolenic acid, dimer acid, hydrogenated dimer acid obtained by adding hydrogen to dimer acid, trimer acid, hydrogenated trimer acid obtained by adding hydrogen to trimer acid, and the like.

Examples of the amine include monoethanolamine, diphenylguanidine, ethylamine, triethylamine, ethylenediamine, triethylenetetramine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methyliidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbemidazole, 2-(1-ethylpentyl)benzimidazole, 2-nonylbenzimidazole. 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3 ',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylenebisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl]methylbenzotriazole, 2,2'-[[(methyl-1H-benzotriazol-1-yl)methyl]imino]bisethanol, 1-(1',2'-dicarboxyethyl)benzotriazle, 1-(2,3-dicarboxypropyl)benzotriazole, 1-[(2-ethylhexylamino)methyl]benzotriazole, 2,6-bis[(1H-benzotriazol-1-yl)methyl]-4-methylphenol, 5-methylbenzotriazole, 5-phenyltetrazole and the like.

Examples of the solvent include an alcohol-based solvent, a glycol ether-based solvent, and the like. Examples of the alcohol-based solvent include ethanol, industrial ethanol (a mixed solvent obtained by adding methanol and/or isopropyl alcohol to ethanol), isopropyl alcohol, isobornyl cyclohexanol, and the like. Examples of the glycol ether-based solvent include hexyl diglycol, diethylene glycol mono-2-ethylhexyl ether, ethylene glycol monophenyl ether, 2-methylpentane-2,4-diol, diethylene glycol monohexyl ether, diethylene glycol dibutyl ether, triethylene glycol monobutyl ether, and the like.

As the thixotropic agent, a ax-based thixotropic agent and an amide-based thixotropic agent are exemplified. As the wax-based thixotropic agent, for example, hydrogenated castor oil and the like are exemplified. As the amide-based thixotropic agent, lauric amide, palmitic amide, stearic amide, behenic amide, hydroxystearic amide, saturated fatty acid amide, oleic amide, erucic amide, unsaturated fatty acid amide, p-toluenernethane amide, aromatic amide, ruethylencbisstearic amide, ethylenebislauric amide, ethylenebishydroxystearic amide, saturated fatty acid bisamide, methylenebisoleic amide, unsaturated fatty acid bisamide, m-xylylenebisstearic amide, aromatic bisamide, saturated fatty acid polyamide, unsaturated fatty acid polyamide, aromatic polyamide, substituted amide, methylol stearic amide, methylol amide, fatty acid ester amide, and the like are exemplified.

Examples of the base agent include rosin, polyethylene glycol, and the like. For no-clean applications, rosin is more preferably not contained. Examples of the halogen compound include organic halogen compounds and hydrohalogenic acid salts of an amine. Examples of the organic halogen compounds include trans-2,3-dibromo-1,4-butenediol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, 2,3-dibromo-2-butene-1,4-diol, trans-2,3-dibromo-2-butene-1,4-diol, cis-2,3-dibromo-2-butene-1,4-diol, tetrabromophthalic acid, and bromosuccinic acid, which are organic bromo compounds. In addition, examples of the organic halogen compounds include chloroalkane, chlorinated fatty acid ester, HET acid, HET anhydride, and the like, which are organic chloro compounds. For no-clean applications, the halogen compound is more preferably not contained.

The hydrohalogenic acid salt of an amine is a compound obtained by reacting an amine and hydrogen halide, and examples thereof include aniline hydrogen chloride, aniline hydrogen bromide, and the like. As the amine in the hydrohalogenic acid salt of an amine, the above-described amines can be used, and examples thereof include ethylamine, ethylenediamine, triethylamine, methylimidazole, 2-ethyl-4-methylimidazole, and the like. Examples of the hydrogen halide include hydrides of chlorine, bromine, iodine, and fluorine (hydrogen chloride, hydrogen bromide, hydrogen iodide, and hydrogen fluoride). In addition, in place of the hydrohalogenic acid salt of an amine or in association with the hydrohalogenic acid salt of an amine, the flux may contain borofluoride, and examples of the borofluoride include hydrofluoboric acid and the like.

Examples of the surfactant include hydroxypropylated ethylenediamine, polyoxypropylene ethylene diamine, ethylene diamine tetrapolyoxyethylene polyoxypropylene, polyoxyethylene alkylamine, polyoxyethylene alkyl ether, polyoxyethylene alkyl amide, and the like. In addition, examples of the surfactant include acetylene glycol-based surfactants such as 2,4,7,9-tetramethyl-5-decyne-4,7-diol-ethylene oxide adduct. Examples of the antioxidant include hindered phenolic antioxidant and the like.

Example of Solder Paste of Present Embodiment

A solder paste of the present embodiment includes the above-described flux and metal powder. The metal powder is preferably a solder not including Ph and is made of pure Sn; a Sn—Ag-based alloy, a Sn—Cu-based alloy, a Sn—Ag—Cu-based alloy, a Sn—Bi-based alloy, a Sn—In-based alloy, or the like; or the powder of a solder obtained by adding Sb, Bi, In, Cu, Zn, As, Ag, Cd, Fe, Ni, Co, Au, Ge, P, or the like to the above-described alloy.

Example of Action and Effect of Flux and Solder Paste of Present Embodiment

The flux which contains the first alcohol compound that has two or more OH groups and has a melting point of lower than 25° C. and the second alcohol compound that has two or more OH groups and has a melting point of higher than 25° C., has a viscosity of 10 Pa·s or more and 50 Pa·s or less at 25° C. and a viscosity of more than 0 Pa·s and 1 Pa·s or less at 100° C. and in which, in measurement by the thermogravimetry method, in a case where 10 mg of the flux is heated up to 25° C. to 250° C. under a $N_2$ atmosphere at a temperature rise rate of 10° C./min, the weight of the flux after heating is 15% or less of the weight of the flux before heating and the solder paste using this flux can be provided with predetermined rheological characteristics that are respectively suitable both at room temperature and under a thermal history that is assumed for soldering even when the amount of rosin or the like, the base agent such as a resin, or the thixotropic agent is decreased or even when rosin is not contained, and furthermore, the base agent and the thixotropic agent other than rosin are not contained.

This configuration enables the realization of a low-residue flux and a solder paste using the low-residue flux. In addition, the two kinds of alcohol compounds that have different aspects in the room temperature region are contained, whereby the degree of freedom for designing a low-residue flux improves.

Examples

Fluxes of examples and comparative examples were prepared according to the compositions shown in Table 1 below, and the viscosities and the amounts of residues of the fluxes were verified. The composition fractions in Table 1 have a unit of "weight (wt) %" with an assumption that the total amount of the flux is set to 100.

<Evaluation of Flux Viscosity>

(1) Verification Method

For the fluxes of examples and comparative examples, the viscosities at 25° C. and at 100° C. were measured. In the measurement of the viscosities of the fluxes of the examples and the comparative examples at 25° C., a PCU-205 viscometer manufactured by Malcolm Company Limited was used. The measurement method is based on JIS Z 3284. In the measurement of the viscosities of the fluxes of the examples and the comparative examples at 100° C., the flux was interposed between the plates of a rheometer (Thermo Scientific HAAKE MARS III (registered trademark)), and then the plates were rotated at 6 Hz.

The viscosities of the first alcohol compound and the second alcohol compound contained in the fluxes of the examples and the comparative examples can also be measured by the same method as the above-described method for the fluxes. However, for glycerin, which was the first alcohol compound contained in the fluxes of the examples and the comparative examples, the rheometer (registered trademark) was used in the measurement of the viscosities at 25° C. The viscosity of glycerin at 25° C. was 0.9 Pa·s. In addition, 2,5-dimethylhexane-2,5-diol, which was the second alcohol compound contained in the examples, was solid at 25° C.

(2) Determination Standards (2-a) Viscosity at 25° C.

O: The viscosity at 25° C. was 10 Pa·s or more and 50 Pa·s or less.

X: The viscosity at 25° C. was less than 10 Pa·s or more than 50 Pa·s.

(2-b) Viscosity at 100° C.

O: The viscosity at 100° C. was more than 0 Pa·s and 1 Pa·s or less.

X: The viscosity at 100° C. was more than 1 Pa·s.

<Evaluation of Amount of Residue>

(1) Verification Method

As a test and evaluation method by the thermogravimetry method (TG method), 10 mg of the flux of each of the example and the comparative example was packed in an aluminum pan and heated up to 25° C. to 250° C. under a $N_2$ atmosphere at a temperature rise rate of 10° C./min using TGD9600 manufactured by ULVAC Inc. Whether the weight of each flux after being heated reached 5% or less or 15% or less of the weight of the flux before being heated was measured.

(2) Determination Standards

OO: The weight was 5% or less of the weight before heating.

O: The weight was more than 5% and 15% or less of the weight before heating.

X: The weight was greater than 15% of the weight before heating.

For fluxes for which the weight after heating was 15% or less of the weight before heating, it can be said that the components in the fluxes were sufficiently volatilized due to heating, and the fluxes are fluxes that do not need cleaning after reflow. For fluxes for which the weight after heating was 5% or less of the weight before heating, it can be said that the components in the fluxes were more sufficiently volatilized due to heating, and the fluxes are fluxes that do not need cleaning after reflow. For fluxes for which the weight was greater than 15% of the weight before heating, it can be said that the components in the fluxes were not sufficiently volatilized. Insufficient volatilization of the components of the flux and the remaining of a large amount of a residue cause poor conduction or the like arising from the absorption of moisture or the like.

The evaluation of the amounts of the residues of the first alcohol compound and the second alcohol compound contained in the fluxes of the examples and the comparative examples can also be measured by the same method as the above-described method for the fluxes. 10 mg of glycerin, which was the first alcohol compound contained in the flux of each of the example and the comparative example, was packed in an aluminum pan and heated up to 25° C. to 250° C. under a N₂ atmosphere at a temperature rise rate of 10° C./min using TGD9600 manufactured by ULVAC Inc. As a result, the weight of glycerin was 5% or less of the weight of glycerin before being heated. In addition, 10 mg of 2,5-dimethylhexane-2,5-diol, which was the second alcohol compound contained in the flux of each of the examples, was packed in an aluminum pan and heated up to 25° C. to 250° C. under a N₂ atmosphere at a temperature rise rate of 10° C./train using TGD9600 manufactured by ULVAC Inc. As a result, the weight of glycerin was 5% or less of the weight of 2,5-dimethylhexane-2,5-diol before being heated.

Comprehensive Evaluation

O: The evaluation of the viscosity at 25° C. and at 100° C. was 0, and the evaluation of the amount of a residue was 00 or 0.

X: Either or both of the evaluation of the viscosity at 25° C. and at 100° C. and the evaluation of the amount of a residue were X.

TABLE 1

|  |  | Example 1 | Example 2 | Example 3 | Example 4 | Example 5 | Example 6 | Example 7 | Example 8 |
|---|---|---|---|---|---|---|---|---|---|
| First alcohol compound | Glycerin | 76 | 64 | 88 | 90 | 62 | 55 | 65 | 75 |
| Second alcohol compound | 2,5-Dimethylhaxane-2,5-diol | 17 | 30 | 10 | 10 | 5 | 30 | 18 | 15 |
| Ratio of first alcohol compound to second alcohol compound |  | 4.47 | 2.13 | 8.80 | 9.00 | 12.40 | 1.83 | 3.61 | 5.00 |
| Organic acid | Glutaric acid | 3 | 3 | 1 |  | 3 | 5 | 3 | 5 |
|  | Succinic acid |  |  |  |  |  |  |  | 5 |
| Amine | 2-Methylimidazole | 3 | 3 | 1 |  |  | 5 | 3 |  |
|  | Diethanolamine |  |  |  |  |  |  |  |  |
| Base agent | Polyethylene glycol |  |  |  |  |  |  | 10 |  |
| Glycol ether-based solvent | Hexyldiglycol |  |  |  |  | 15 | 5 |  |  |
| Surfactant | 2,4,7,9-Tetramethyl-5-decyne-4,7-diolethylene oxide adduct | 1 |  |  |  |  |  |  | 1 |
| Thixotropic agent | Hydrogenated castor oil |  |  |  |  | 15 |  |  |  |
|  | Amide-based thixotropic agent |  |  |  |  |  |  |  |  |
| Evaluation of viscosity at 25° C. |  | ○ | ○ | ○ | ○ | ○ | ○ | ○ | ○ |
| Evaluation of viscosity at 100° C. |  | ○ | ○ | ○ | ○ | ○ | ○ | ○ | ○ |
| Evaluation of amount of residue |  | ○○ | ○○ | ○○ | ○○ | ○ | ○○ | ○ | ○○ |
| Comprehensive evaluation |  | ○ | ○ | ○ | ○ | ○ | ○ | ○ | ○ |

|  |  | Example 9 | Example 10 | Example 11 | Example 12 | Comparative Example 1 | Comparative Example 2 | Comparative Example 3 |
|---|---|---|---|---|---|---|---|---|
| First alcohol compound | Glycerin | 75 | 77 | 81 | 81 | 100 | 98 | 61 |
| Second alcohol compound | 2,5-Dimethylhaxane-2,5-diol | 15 | 22 | 14 | 14 |  |  |  |
| Ratio of first alcohol compound to second alcohol compound |  | 5.00 | 3.50 | 5.79 | 5.79 | — | — | — |
| Organic acid | Glutaric acid |  |  |  |  |  | 1 | 3 |
|  | Succinic acid |  |  |  |  |  |  |  |
| Amine | 2-Methylimidazole | 5 |  |  |  |  | 1 | 3 |
|  | Diethanolamine | 5 |  |  |  |  |  |  |
| Base agent | Polyethylene glycol |  |  |  |  |  |  | 10 |
| Glycol ether-based solvent | Hexyldiglycol |  |  | 1 |  |  |  | 10 |
| Surfactant | 2,4,7,9-Tetramethyl-5-decyne-4,7-diolethylene oxide adduct |  |  |  | 5 |  |  |  |
| Thixotropic agent | Hydrogenated castor oil |  |  |  |  | 5 |  | 5 |
|  | Amide-based thixotropic agent |  |  |  |  |  |  | 8 |
| Evaluation of viscosity at 25° C. |  | ○ | ○ | ○ | ○ | X | X | ○ |
| Evaluation of viscosity at 100° C. |  | ○ | ○ | ○ | ○ | ○ | ○ | ○ |
| Evaluation of amount of residue |  | ○○ | ○○ | ○○ | ○○ | ○○ | ○○ | X |
| Comprehensive evaluation |  | ○ | ○ | ○ | ○ | X | X | X |

As shown in Example 1, in the flux in which 76 wt %, which is within the range specified in the present invention, of glycerin was contained as the first alcohol compound, 17 wt %, which is within the range specified in the present invention, of 2,5-dimethylhexane-2,5-diol was contained as the second alcohol compound, the weight ratio (the first alcohol compound the second alcohol compound) of the first alcohol compound to the second alcohol compound was 4.47, which is within the range specified by the present invention, and furthermore, within the ranges specified in the present invention, 3 wt % of glutaric acid was contained as the organic acid, 3 wt % of 2-methylimidazole was contained as the amine, and 1 wt % of a 2,4,7,9-tetramethyl-5-decyne-4,7-diol-ethylene oxide adduct was contained as the surfactant, the following effects were obtained: the viscosity at 25° C. was 10 Pa·s or more and 50 Pa·s or less, the viscosity at 100° C. was more than 0 Pa·s and 1 Pa·s or less, and, at room temperature, the flux had a predetermined viscosity so as not to flow out and was converted into the liquid state so as to spread under the thermal history that is assumed for soldering, and thus had predetermined rheological characteristics that are respectively suitable both at room temperature and under the thermal history that is assumed for soldering. In addition, the amount of the residue was 5 wt % or less, which shows that a sufficient effect of suppressing the amount of the residue and attaining a low residue was obtained.

As shown in Example 2, also in the flux in which 64 wt %, which is within the range specified in the present invention, of glycerin was contained as the first alcohol compound, 30 wt %, which is within the range specified in the present invention, of 2,5-dimethylhexane-2,5-diol was contained as the second alcohol compound, the weight ratio of the first alcohol compound to the second alcohol compound was 2.13, which is within the range specified by the present invention, and furthermore, within the ranges specified in the present invention, 3 wt % of glutaric acid was contained as the organic acid, and 3 wt % of 2-methylimidazole was contained as the amine, the following effects were obtained: the viscosity at 25° C. was 10 Pa·s or more and 50 Pa·s or less, the viscosity at 100° C. was more than 0 Pa·s and 1 Pa·s or less, and the flux had predetermined rheological characteristics that are respectively suitable both at room temperature and under the thermal history that is assumed for soldering. In addition, the amount of the residue was 5 wt % or less, which shows that a sufficient effect of suppressing the amount of the residue and attaining a low residue was obtained.

As shown in Example 3, also in the flux in which 88 wt %, which is within the range specified in the present invention, of glycerin was contained as the first alcohol compound, 10 wt %, which is within the range specified in the present invention, of 2,5-dimethylhexane-2,5-diol was contained as the second alcohol compound, the weight ratio of the first alcohol compound to the second alcohol compound was 8.80, which is within the range specified by the present invention, and furthermore, within the ranges specified in the present invention, 1 wt % of glutaric acid was contained as the organic acid, and 1 wt % of 2-methylimidazole was contained as the amine, the following effects were obtained: the viscosity at 25° C. was 10 Pa·s or more and 50 Pa·s or less, the viscosity at 100° C. was more than 0 Pa·s and 1 Pa·s or less, and the flux had predetermined rheological characteristics that are respectively suitable both at room temperature and under the thermal history that is assumed for soldering. In addition, the amount of the residue was 5 wt % or less, which shows that a sufficient effect of suppressing the amount of the residue and attaining a low residue was obtained.

As shown in Example 4, also in the flux in which 90 wt %, which is within the range specified in the present invention, of glycerin was contained as the first alcohol compound, 10 wt %, which is within the range specified in the present invention, of 2,5-dimethylhexane-2,5-diol was contained as the second alcohol compound, and the weight ratio of the first alcohol compound to the second alcohol compound was 9.00, which is within the range specified by the present invention, the following effects were obtained: the viscosity at 25° C. was 10 Pa·s or more and 50 Pa·s or less, the viscosity at 100° C. was more than 0 Pa·s and 1 Pa·s or less, and the flux had predetermined rheological characteristics that are respectively suitable both at room temperature and under the thermal history that is assumed for soldering. In addition, the amount of the residue was 5 wt % or less, which shows that a sufficient effect of suppressing the amount of the residue and attaining a low residue was obtained.

As shown in Example 5, also in the flux in which 62 wt %, which is within the range specified in the present invention, of glycerin was contained as the first alcohol compound, 5 wt %, which is within the range specified in the present invention, of 2,5-dimethylhexane-2,5-diol was contained as the second alcohol compound, the weight ratio of the first alcohol compound to the second alcohol compound was 12.40, which is within the range specified by the present invention, and furthermore, within the ranges specified in the present invention, 3 wt % of glutaric acid was contained as the organic acid, 15 wt % of hexyl diglycol was contained as the glycol ether-based solvent, and 1.5 wt % of hydrogenated castor oil was contained as the thixotropic agent, the following effects were obtained: the viscosity at 25° C. was 10 Pa·s or more and 50 Pas or less, the viscosity at 100° C. was more than 0 Pas and 1 Pas or less, and the flux had predetermined rheological characteristics that are respectively suitable both at room temperature and under the thermal history that is assumed for soldering. In addition, the amount of the residue was more than 5 wt % and 15 wt % or less, which shows that a sufficient effect of suppressing the amount of the residue and attaining a low residue was obtained.

As shown in Example 6, also in the flux in which 55 wt %, which is within the range specified in the present invention, of glycerin was contained as the first alcohol compound, 30 wt %, which is within the range specified in the present invention, of 2,5-dimethylhexane-2,5-diol was contained as the second alcohol compound, the weight ratio of the first alcohol compound to the second alcohol compound was 1.83, which is within the range specified by the present invention, and furthermore, within the ranges specified in the present invention, 5 wt % of glutaric acid was contained as the organic acid, 5 wt % of 2-methylimidazole was contained as the amine, and 5 wt % of hexyl diglycol was contained as the glycol ether-based solvent, the following effects were obtained: the viscosity at 25° C. was 10 Pa·s or more and 50 Pa·s or less, the viscosity at 100° C. was more than 0 Pa·s and 1 Pa·s or less, and the flux had predetermined rheological characteristics that are respectively suitable both at room temperature and under the thermal history that is assumed for soldering. In addition, the amount of the residue was 5 wt % or less, which shows that a sufficient effect of suppressing the amount of the residue and attaining a low residue was obtained.

As shown in Example 7, also in the flux in which 65 wt %, which is within the range specified in the present invention, of glycerin was contained as the first alcohol compound, 18 wt %, which is within the range specified in the present invention, of 2,5-dimethylhexane-2,5-diol was contained as the second alcohol compound, the weight ratio of the first alcohol compound to the second alcohol compound was 3.61, which is within the range specified by the present invention, and furthermore, within the ranges specified in the present invention, 3 wt % of glutaric acid was contained as the organic acid, 3 wt % of 2-methylimidazole as the amine, 10 wt % of polyethylene glycol was contained as the base agent, and 1 wt % of 2,4,7,9-tetra ethyl-5-decyne-4,7-diol-ethylene oxide adduct was contained as the surfactant, the following effects were obtained: the viscosity at 25° C. was 10 Pa·s or more and 50 Pa·s or less, the viscosity at 100° C. was more than 0 Pa·s and 1 Pa·s or less, and the flux had predetermined rheological characteristics that are respectively suitable both at room temperature and under the thermal history that is assumed for soldering. In addition, the amount of the residue was more than 5% and 15 wt % or less, which shows that a sufficient effect of suppressing the amount of the residue and attaining a low residue was obtained.

As shown in Example 8, also in the flux in which 75 wt %, which is within the range specified in the present invention, of glycerin was contained as the first alcohol compound, 15 wt %, which is within the range specified in the present invention, of 2,5-dimethylhexane-2,5-diol was contained as the second alcohol compound, the weight ratio of the first alcohol compound to the second alcohol compound was 5.00, which is within the range specified by the present invention, and furthermore, within the ranges specified in the present invention, 5 wt % of glutaric acid was contained as the organic acid, and 5 wt % of succinic acid was contained, the following effects were obtained: the viscosity at 25° C. was 10 Pa·s or more and 50 Pa·s or less, the viscosity at 100° C. was more than 0 Pa·s and 1 Pa·s or less, and the flux had predetermined rheological characteristics that are respectively suitable both at room temperature and under the thermal history that is assumed for soldering. In addition, the amount of the residue was 5 wt % or less, which shows that a sufficient effect of suppressing the amount of the residue and attaining a low residue was obtained.

As shown in Example 9, also in the flux in which 75 wt %, which is within the range specified in the present invention, of glycerin was contained as the first alcohol compound, 15 wt %, which is within the range specified in the present invention, of 2,5-dimethylhexane-2,5-diol was contained as the second alcohol compound, the weight ratio of the first alcohol compound to the second alcohol compound was 5.00, which is within the range specified by the present invention, and furthermore, within the ranges specified in the present invention, 5 wt % of 2-methylimidazole was contained as the amine, and 5 wt % of diethanolamine was contained, the following effects were obtained: the viscosity at 25° C. was 10 Pa·s or more and 50 Pa·s or less, the viscosity at 100° C. was more than 0 Pa·s and 1 Pa·s or less, and the flux had predetermined rheological characteristics that are respectively suitable both at room temperature and under the thermal history that is assumed for soldering. In addition, the amount of the residue was 5 wt % or less, which shows that a sufficient effect of suppressing the amount of the residue and attaining a low residue was obtained.

As shown in Example 10, also in the flux in which 77 wt %, which is within the range specified in the present invention, of glycerin was contained as the first alcohol compound, 22 wt %, which is within the range specified in the present invention, of 2,5-dimethylhexane-2,5-diol was contained as the second alcohol compound, the weight ratio of the first alcohol compound to the second alcohol compound was 3.50, which is within the range specified by the present invention, and furthermore, within the range specified in the present invention, 1 wt % of hexyl diglycol was contained as the glycol ether-based solvent, the following effects were obtained: the viscosity at 25° C. was 10 Pa·s or more and 50 Pa·s or less, the viscosity at 100° C. was more than 0 Pa·s and 1 Pa·s or less, and the flux had predetermined rheological characteristics that are respectively suitable both at room temperature and under the thermal history that is assumed for soldering. In addition, the amount of the residue was 5 wt % or less, which shows that a sufficient effect of suppressing the amount of the residue and attaining a low residue was obtained.

As shown in Example 11, also in the flux in which 81 wt %, which is within the range specified in the present invention, of glycerin was contained as the first alcohol compound, 14 wt %, which is within the range specified in the present invention, of 2,5-dimethylhexane-2,5-diol was contained as the second alcohol compound, the weight ratio of the first alcohol compound to the second alcohol compound was 5.79, which is within the range specified by the present invention, and furthermore, within the range specified in the present invention, 5 wt % of 2,4,7,9-tetramethyl-5-decyne-4,7-diol-ethylene oxide adduct was contained as the surfactant, the following effects were obtained: the viscosity at 25° C. was 10 Pa·s or more and 50 Pa·s or less, the viscosity at 100° C. was more than 0 Pa·s and 1 Pa·s or less, and the flux had predetermined rheological characteristics that are respectively suitable both at room temperature and under the thermal history that is assumed for soldering. In addition, the amount of the residue was 5 wt % or less, which shows that a sufficient effect of suppressing the amount of the residue and attaining a low residue was obtained.

As shown in Example 12, also in the flux in which 81 wt %, which is within the range specified in the present invention, of glycerin was contained as the first alcohol compound, 14 wt %, which is within the range specified in the present invention, of 2,5-dimethylhexane-2,5-diol was contained as the second alcohol compound, the weight ratio of the first alcohol compound to the second alcohol compound was 5.79, which is within the range specified by the present invention, and furthermore, within the range specified in the present invention, 5 wt % of hydrogenated castor oil was contained as the thixotropic agent, the following effects were obtained: the viscosity at 25° C. was 10 Pa·s or more and 50 Pa·s or less, the viscosity at 100° C. was more than 0 Pa·s and 1 Pa·s or less, and the flux had predetermined rheological characteristics that are respectively suitable both at room temperature and under the thermal history that is assumed for soldering. In addition, the amount of the residue was 5 wt % or less, which shows that a sufficient effect of suppressing the amount of the residue and attaining a low residue was obtained.

In contrast, as shown in Comparative Example 1, in the flux containing 100 wt % which exceeds the range specified in the present invention, of glycerin as the first alcohol compound, an effect of having predetermined rheological characteristics with respect to the thermal history that is assumed for soldering and an effect of attaining a low residue were obtained, but the viscosity at 25° C. was less than 10 Pa·s, and it was not possible to have predetermined rheological characteristics at room temperature.

In addition, as shown in Comparative Example 2, in the flux containing 98 wt %, which exceeds the range specified in the present invention, of glycerin as the first alcohol compound and further containing 1 wt % of glutaric acid as the organic acid and 1 wt % of 2-methylimidazole as the amine, an effect of having predetermined rheological characteristics with respect to the thermal history that is assumed for soldering and an effect of attaining a low residue were obtained, but the viscosity at 25° C. was less than 10 Pa·s, and it was not possible to have predetermined rheological characteristics at room temperature.

Furthermore, as shown in Comparative Example 3, in the flux in which 61 wt %, which is within the range specified in the present invention, of glycerin was contained as the first alcohol compound, but the second alcohol compound was not contained, and furthermore, 3 wt % of glutaric acid was contained as the organic acid, 3 wt % of 2-methylimidazole was contained as the amine, 10 wt % of polyethylene glycol was contained as the base agent, 10 wt % of hexyldiglycol was contained as the glycol ether-based solvent, and, as the thixotropic agent, 5 wt % of hydrogenated castor oil and 8 wt % of an amide-based thixotropic agent were contained, the effect of having predetermined rheological characteristics that are respectively suitable both at room temperature and under the thermal history that assumed for soldering was obtained, but the amount of a residue exceeded 15 wt %, it was not possible to suppress the amount of the residue, and an effect of attaining a low residue was not obtained.

The above-described facts show that, in the flux in which the first alcohol compound that had two or more OH groups and had a melting point of lower than 25° C. and the second alcohol compound that had two or more OH groups and had a melting point of higher than 25° C. were contained, the flux had a viscosity of 10 Pa·s or more and 50 Pa·s or less at 25° C. and had a viscosity of more than 0 Pa·s and 1 Pa·s or less at 100° C., and, in measurement by the thermogravimetry method, in a case where 10 mg of the flux is heated up to 25° C. to 250° C. under a $N_2$ atmosphere at a temperature rise rate of 10° C./min, the weight of the flux after heating was 15% or less of the weight of the flux before heating, an effect of having predetermined rheological characteristics that are respectively suitable both at room temperature and under a thermal history that is assumed for soldering and an effect of suppressing the amount of a residue were obtained.

These effects were not impaired even when the flux contained a different organic acid and a different amine as activators within the ranges specified in the present invention. In addition, the effects were not impaired even when the flux contained a base agent, a solvent, and a thixotropic agent within the ranges specified in the present invention.

The invention claimed is:

1. A flux containing alcohol compounds that has two or more OH groups, the flux comprising:
   a first alcohol compound that has two or more OH groups and has a melting point of lower than 25° C.; and
   a second alcohol compound that has two or more OH groups and has a melting point of higher than 25° C.,
   wherein the first alcohol compound is glycerin, the second alcohol compound is 2,5-dimethylhexane-2,5-diol, and in a case where 10 mg of the flux having a viscosity of 10 Pa·s or more and 50 Pa·s or less at 25° C. and a viscosity of more than 0 Pa·s and 1 Pa·s or less at 100° C. is heated up to 25° C. to 250° C. under a $N_2$ atmosphere at a temperature rise rate of 10° C./min, a weight of the flux after heating is 15% or less of the weight of the flux before heating, and
   wherein the flux comprises 55 wt % or more and 90 wt % or less of glycerin.

2. The flux according to claim 1,
   wherein, in a case where 10 mg of the flux is heated up to 25° C. to 250° C. under the $N_2$ atmosphere at a temperature rise rate of 10° C./min, the weight of the flux after heating is 5% or less of the weight of the flux before heating.

3. The flux according to claim 1, further comprising:
   5 wt % or more and 30 wt % or less of 2,5-dimethylhexane-2,5-diol.

4. The flux according to claim 1,
   wherein a weight ratio of glycerin to 2,5-dimethylhexane-2,5-diol, which is denoted by the first alcohol compound/the second alcohol compound, is 1.83 or more and 12.40 or less.

5. The flux according to claim 1, further comprising:
   0 wt % or more and 10 wt % or less of an organic acid.

6. The flux according to claim 1, further comprising:
   0 wt % or more and 10 wt % or less of an amine.

7. The flux according to claim 1, further comprising:
   0 wt % or more and 15 wt % or less of a solvent.

8. The flux according to claim 1, further comprising:
   0 wt % or more and 15 wt % or less of a thixotropic agent.

9. The flux according to claim 1, further comprising:
   0 wt % or more and 10 wt % or less of a base agent.

10. The flux according to claim 1, further comprising:
    at least one of a halogen compound, a colorant, a defoamer, an antioxidant, and a surfactant.

11. The flux according to claim 1, the flux comprising:
    65 wt % or more and 90 wt % or less of glycerin.

12. The flux according to claim 11, the flux comprising:
    5 wt % or more and less than 10 wt % of 2,5-dimethylhexane-2,5-diol.

13. The flux according to claim 1, the flux comprising:
    75 wt % or more and 90 wt % or less of glycerin.

14. The flux according to claim 13, the flux comprising:
    5 wt % or more and less than 10 wt % of 2,5-dimethylhexane-2,5-diol.

15. The flux according to claim 1, further comprising:
    0 wt % or more and 10 wt % or less of an organic acid,
    0 wt % or more and 10 wt % or less of an amine, and
    at least one of a halogen compound, a colorant, a defoamer, an antioxidant, and a surfactant.

16. A solder paste comprising:
    the flux according to claim 1; and
    solder powder.

17. A solder paste comprising:
    the flux according to claim 15; and
    solder powder.

* * * * *